(12) United States Patent
Okada et al.

(10) Patent No.: US 7,768,159 B2
(45) Date of Patent: Aug. 3, 2010

(54) LINEAR MOTOR AND MACHINE TOOL HAVING THE SAME MOUNTED THEREON

(75) Inventors: Takuya Okada, Kyoto (JP); Noritaka Ishiyama, Yamagata (JP)

(73) Assignees: Murata Machinery, Ltd., Kyoto-shi (JP); GMC Hillstone Co., Ltd., Yamagata (JP)

( * ) Notice: Subject to any disclaimer, the term of this patent is extended or adjusted under 35 U.S.C. 154(b) by 338 days.

(21) Appl. No.: 11/902,687

(22) Filed: Sep. 25, 2007

(65) Prior Publication Data

US 2008/0079522 A1 Apr. 3, 2008

(30) Foreign Application Priority Data

Sep. 28, 2006 (JP) ............... 2006-264352

(51) Int. Cl.
*H02K 41/02* (2006.01)
(52) U.S. Cl. .................. 310/12.24; 310/15; 310/35; 310/71; 310/89; 310/101; 100/144
(58) Field of Classification Search .............. 310/12.24, 310/15–35, 71, 89, 101; 100/144; *H02K 41/02*
See application file for complete search history.

(56) References Cited

U.S. PATENT DOCUMENTS

| | | | | |
|---|---|---|---|---|
| 4,692,673 A | * | 9/1987 | DeLong ................. | 318/132 |
| 4,924,123 A | * | 5/1990 | Hamajima et al. .......... | 310/15 |
| 5,691,582 A | * | 11/1997 | Lucas et al. .............. | 310/14 |
| 5,896,076 A | * | 4/1999 | van Namen ............... | 335/229 |
| 6,239,517 B1 | * | 5/2001 | Nakamura et al. ......... | 310/12.28 |
| 6,363,750 B1 | * | 4/2002 | Chiodo ................. | 65/108 |
| 6,397,635 B1 | * | 6/2002 | Sasso et al. .............. | 65/160 |
| 6,608,408 B1 | * | 8/2003 | Denne ................. | 310/14 |
| 6,701,748 B1 | * | 3/2004 | Hartman et al. .......... | 65/29.18 |
| 6,879,064 B2 | * | 4/2005 | Kobayashi et al. ........ | 310/12.01 |
| 2003/0218391 A1 | * | 11/2003 | Hirata ................. | 310/12 |
| 2006/0181158 A1 | * | 8/2006 | Tajima et al. ............ | 310/12 |

FOREIGN PATENT DOCUMENTS

| | | |
|---|---|---|
| JP | 3-215160 A | 9/1991 |
| JP | 10-313566 A | 11/1998 |
| JP | 2001-352747 A | 12/2001 |
| JP | 2004-122285 A | 4/2004 |

\* cited by examiner

*Primary Examiner*—Quyen Leung
*Assistant Examiner*—John K Kim
(74) *Attorney, Agent, or Firm*—Westerman, Hattori, Daniels & Adrian, LLP

(57) ABSTRACT

The present invention provides a linear motor 1 that can prevent a magnet member 2 from falling down when a power supply is turned off. A linear motor 1 includes a magnet member 2 composed of permanent magnets having alternately arranged respective N poles and S poles and a coil member 3 which surrounds a periphery of the magnet member 2 and trough which the magnet member 2 is movable in an axial direction relative to the coil member 3. A magnetic substance 3 is provided in the vicinity of one end of the coil member 3 to allow the magnet member 2 to exert a magnetic attractive force.

2 Claims, 7 Drawing Sheets

FIGURE 5A
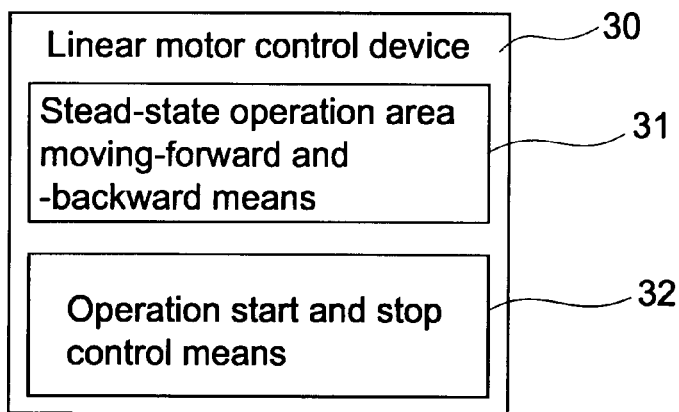
FIGURE 5B    FIGURE 5C
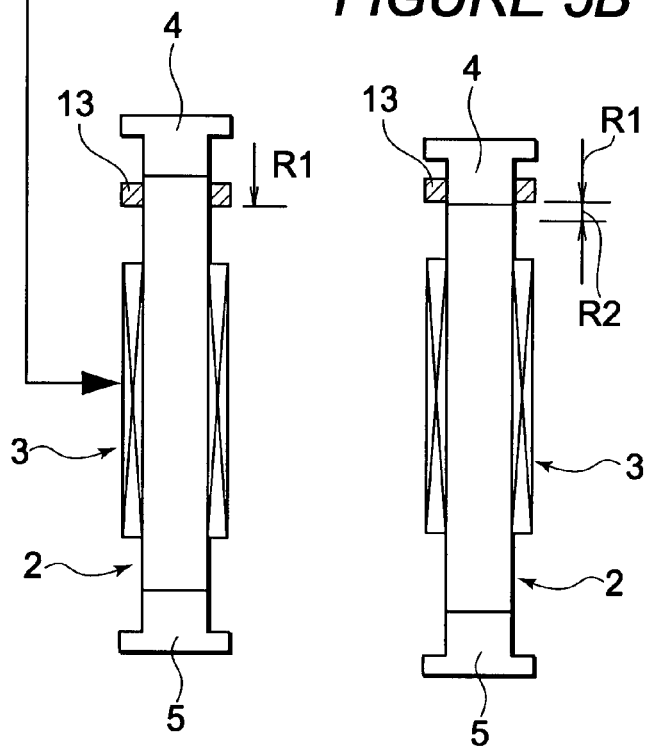
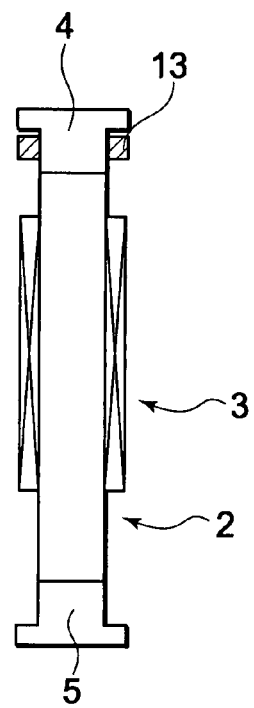

US 7,768,159 B2

LINEAR MOTOR AND MACHINE TOOL HAVING THE SAME MOUNTED THEREON

FIELD OF THE INVENTION

The present invention relates to a linear motor and a machine tool such as a press machine in which the linear motor is mounted.

BACKGROUND OF THE INVENTION

A conventionally proposed linear motor comprises a magnet member composed of round-shaft-like permanent magnets having alternately arranged respective N poles and S poles, and a coil member having a plurality of coils arranged in an axial direction so as to surround the periphery of the magnet member (for example, the Unexamined Japanese Patent Application Publication (Tokkai-Hei) No. 10-313566).

The linear motor disclosed in the Unexamined Japanese Patent Application Publication (Tokkai-Hei) No. 10-313566 is used, for example, in OA equipment or the like in place of a combination of a rotary motor and a ball screw. However, using the linear motor in a machine tool such as a press machine which makes direct-acting motion also results in a simple configuration and enhanced controllability.

Where the linear motor is used in a press machine or the like, when, for example, a movable portion such as a ram is stopped at an elevation standby position, the movable portion can desirably be stopped without falling down even though a motor power supply is turned off for power saving or the like. Further, even if the power supply is not turned off at the elevation standby position, for safety, the movable portion such as the ram is preferably prevented from falling down inadvertently and maintains the stopped position when a power supply system becomes defective. To prevent the possible fall-down, it is possible to use a spring or an air cylinder. However, this disadvantageously increases the number of parts required, complicating the structure.

An object of the present invention is to provide a linear motor that can use a simple configuration to prevent the magnet member from moving inadvertently when the power supply is turned off. Another object of the present invention is to provide a linear motor that can use a simple configuration to prevent the magnet member from falling down when the power supply is turned off. Yet another object of the present invention is to provide a linear motor control device which can prevent the magnet member from falling down when the power supply is turned off and during operation, inhibit fall-down preventing means from imposing excess loads during operation. Still another object of the present invention is to provide a linear motor mounted machine tool which has a simple structure owing to the need for a reduced number of parts required and which can be prevented from operating inadvertently when the power supply is turned off, improving safety.

SUMMARY OF THE INVENTION

A linear motor in accordance with the present invention comprises a magnet member composed of permanent magnets having respective N poles and S poles alternately arranged in a predetermined axial direction, a coil member which is located orthogonally to the axial direction with respect to the magnet member and through which the magnet member is movable in the axial direction relative to the coil member, and a magnetic substance located in the vicinity of one end of the coil member to allow the magnet member to exert a magnetic attractive force. The predetermined axial direction may be a vertical direction, a horizontal direction, or an oblique direction.

With this configuration, when the magnet member is positioned in association with the magnetic substance, even if an excitation current for the coil member is interrupted, the current position of the magnet member is held by a magnetic attractive force generated between the magnet member, composed of the permanent magnets, and the magnetic substance. Alternatively, the magnet member moves to and remains at a position where the magnetic attractive force acting between the magnet member and the magnetic substance is balanced with an external force such as gravity which acts on the magnet member.

Further, the only requirement is the provision of the magnetic substance. The linear motor in accordance with the present invention thus has a simpler configuration than a linear motor having current position holding means such as a spring or a cylinder device. Thus, the simple configuration can be used to prevent the magnet member from moving inadvertently when the power supply is turned off.

In the present invention, the predetermined axial direction may be a vertical direction, and the magnet member may be a movable-side member, whereas the coil member may be a static-side member. Further, the magnetic substance may be located in the vicinity of an upper end of the coil member to inhibit the magnet member from falling down. This configuration can prevent the magnet member from falling down inadvertently.

Where the magnetic substance is thus located in the vicinity of the upper end of the coil member, the magnetic substance is preferably installed at a height such that with the magnet member moved to a top dead center with respect to the coil member, the center of the vertical width of the magnetic substance is positioned in the vicinity of a center position of the vertical width between any magnetic poles of the N poles and the S poles alternately arranged in the magnet member. Where the magnet member has a plurality of unit magnets having respective N poles and S poles, and stacked so that the magnetic poles of the same polarity lie opposite each other, the position of a repulsion surface that is an overlapping surface on which the same polarities of the unit magnets overlap coincides with the center position of the vertical width between the magnetic poles.

A magnetic field generated by the magnet member having the alternately arranged N poles and S poles has the highest magnetic flux density at the center of the magnetic pole width between the magnetic poles. The magnet member having the stacked unit magnets as described above has the highest magnetic flux density at the repulsion surface. Thus, when the magnetic substance is located at the magnetic pole center of the magnet member or at the height position corresponding to the repulsion surface, the greatest magnetic attractive force is exerted between the magnetic substance and the magnet member. This allows the magnetic substance to reliably prevent the magnet member from falling down. That is, with the magnetic substance located in the vicinity of the upper end of the coil member, where the magnet member is positioned at the top dead center, even if the magnetic substance is located at a height position lying opposite the magnet member, an insufficient magnetic attractive force may be exerted to inhibit the magnetic substance from preventing the possible fall-down of the magnet member where the magnetic substance is positioned away from the magnetic pole center or repulsion surface of the magnet member.

Even where the linear motor uses the same magnet member, provided that the magnetic substance is located in the vicinity of the center position of the vertical width between the magnetic poles of the magnet member or the repulsion surface of the magnet member, a great magnetic attractive force is exerted to enable the fall-down prevention. Where the magnetic substance is provided at the magnetic pole center of the magnet member or at a height in the vicinity of the repulsion surface, the magnetic substance is preferably located at a position within a steady-state operation area of the magnet member which is free from cogging. This may be achieved by, for example, setting the steady-state operation area of the magnet member within a range equal to or shorter than a cogging occurrence period.

In the present invention, the magnet member may be shaped like a shaft, and the coil member may be shaped like a cylinder having a plurality of coils arranged in the axial direction and surrounding a periphery of the magnet member. The linear motor composed of the shaft-like magnet member and the cylindrical coil member has a compact configuration and exerts a great thrust. The magnetic substance in accordance with the present invention can also be provided in the linear motor composed of the shaft-like magnet member and the cylindrical coil member to provide a function for holding the current position or preventing fall-down.

A linear motor control device 30 in accordance with the present invention controls the linear motor 1 in accordance with the present invention in which the predetermined axial direction is a vertical direction and in which the magnet member 2 is a movable-side member, whereas the coil member 3 is a static-side member and in which the magnetic substance 13 is located in the vicinity of the upper end of the coil member 3. The linear motor control device 30 controls an excitation current for the coil member 3 of the linear motor 1 to control operation of the magnet member 2 of the linear motor 1, and has steady-state operation area moving-forward and -backward control means 31 for performing control such that the magnet member 2 performs a moving-forward and -backward operation within a steady-state operation area R2 positioned below a fall-down inhibition enabled area R1 that is a height area in which the magnetic substance 13 inhibits the magnet member 2 from falling down, and operation start and stop control means 32 for performing control such that the magnet member 2 operates over the steady-state operation area R2 and the fall-down inhibition enabled area R1 and stops in the fall-down inhibition enabled area R2. With this configuration, the linear motor 1 is stopped when the magnet member 2 is located in the fall-down inhibition area R1, the height area in which the magnetic substance 13 inhibits the magnet member 2 from falling down.

Consequently, even if a power supply for the coil member 3 is turned off during a stopped state or the power supply is inadvertently interrupted during the stopped state with the power supply kept on, the magnet member 2 is prevented from falling down. When the magnet member 2 performs a moving-forward or -backward operation, the magnet member 2 performs the operation in the steady-state operation area R2, located below the fall-down inhibition enabled area R1. This prevents the magnetic substance 13 from resisting the operation or reduces the degree to which the magnetic substance 13 resists the operation. The linear motor control device 30 can thus prevent the magnet member 2 from falling down when the power supply is turned off. Further, during operation, the linear motor control device can prevent the fall-down preventing means from imposing excess loads.

A linear motor mounted machine tool in accordance with the present invention comprises a linear motor in accordance with the present invention having any of the above configurations and a movable portion that is driven forward and backward by the linear motor to move a tool or a workpiece. The term "machine tool" as used herein is not limited to machinery such as a lathe which performs a machining operation but refers to a machine tool in a broad sense indicating machines in general which process articles, and the machine tool includes a punch press and other press machines. With this configuration, the movable portion moving forward and backward is driven by the linear motor. In contrast to a machine tool using a rotary motor, the present machine tool eliminates the need for a mechanism converting rotation into rectilinear motion. This enables a reduction in the number of parts required, simplifying the structure. Further, the use of the linear motor in accordance with the present invention avoids the inadvertent fall-down of the magnet member when the power supply is turned off, improving safety.

The linear motor in accordance with the present invention comprises the magnet member composed of the permanent magnets having the respective N poles and S poles alternately arranged in the predetermined axial direction, the coil member which is located orthogonally to the axial direction with respect to the magnet member and through which the magnet member is movable in the axial direction relative to the coil member, and the magnetic substance located in the vicinity of one end of the coil member to allow the magnetic attractive force of the magnet member to act. This makes it possible to use the simple configuration to prevent the magnet member from moving inadvertently when the power supply is turned off.

Where the predetermined axial direction is the vertical direction, and the magnet member is the movable-side member, whereas the coil member is the static-side member and where the magnetic substance is located in the vicinity of the upper end of the coil member to inhibit the magnet member from falling down, the simple configuration can be used to prevent the magnet member from falling down inadvertently when the power supply is turned off.

Where the predetermined axial direction is the vertical direction, and the magnet member is the movable-side member, whereas the coil member is the static-side member and where the magnetic substance is located in the vicinity of the upper end of the coil member, where the magnetic substance is installed at the height such that with the magnet member moved to the top dead center with respect to the coil member, the center of the vertical width of the magnetic substance is positioned in the vicinity of a center position of the vertical width between any magnetic poles of the N poles and S poles alternately arranged in the magnet member, the magnet member is more reliably prevented from falling down.

Where the magnet member is shaped like the shaft, and the coil member is shaped like the cylinder having the plurality of coils arranged in the axial direction and surrounding the periphery of the magnet member, a high output can be obtained using the compact configuration. This configuration is also effective for preventing the possible inadvertent movement or fall-down when the power supply is turned off as described above.

The linear motor control device in accordance with the present invention controls the excitation current for the coil member of the linear motor to control operation of the magnet member of the linear motor, and has the steady-state operation area moving-forward and -backward control means for performing control such that the magnet member performs the moving-forward and -backward operation within the steady state operation area positioned below the fall-down inhibition enabled area that is the height area in which the magnetic substance inhibits the magnet member from falling down, and the operation start and stop control means for performing control such that the magnet member operates over the steady-state operation area and the fall-down inhibition enabled area and stops in the fall-down inhibition enabled area. This makes it possible to prevent the magnet member from falling down when the power supply is turned off.

Further, during operation, the linear motor control device can prevent the fall-down preventing means form imposing excess loads.

The linear motor mounted machine tool in accordance with the present invention comprises the linear motor in accordance with the present invention and the movable portion that is driven forward and backward by the linear motor to move the tool or the workpiece. This enables a reduction in the number of parts required, simplifying the structure. The linear motor mounted machine tool also makes it possible to avoid the possible inadvertent operation when the power supply is turned off, improving safety.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 5 is a combination of a block diagram of the conceptual configuration of a linear motor control device controlling the linear motor in accordance with the embodiment shown in FIG. 4 and a diagram illustrating the operation of the linear motor control device.

DETAILED DESCRIPTION OF THE PREFERRED EMBODIMENTS

Figure 1:
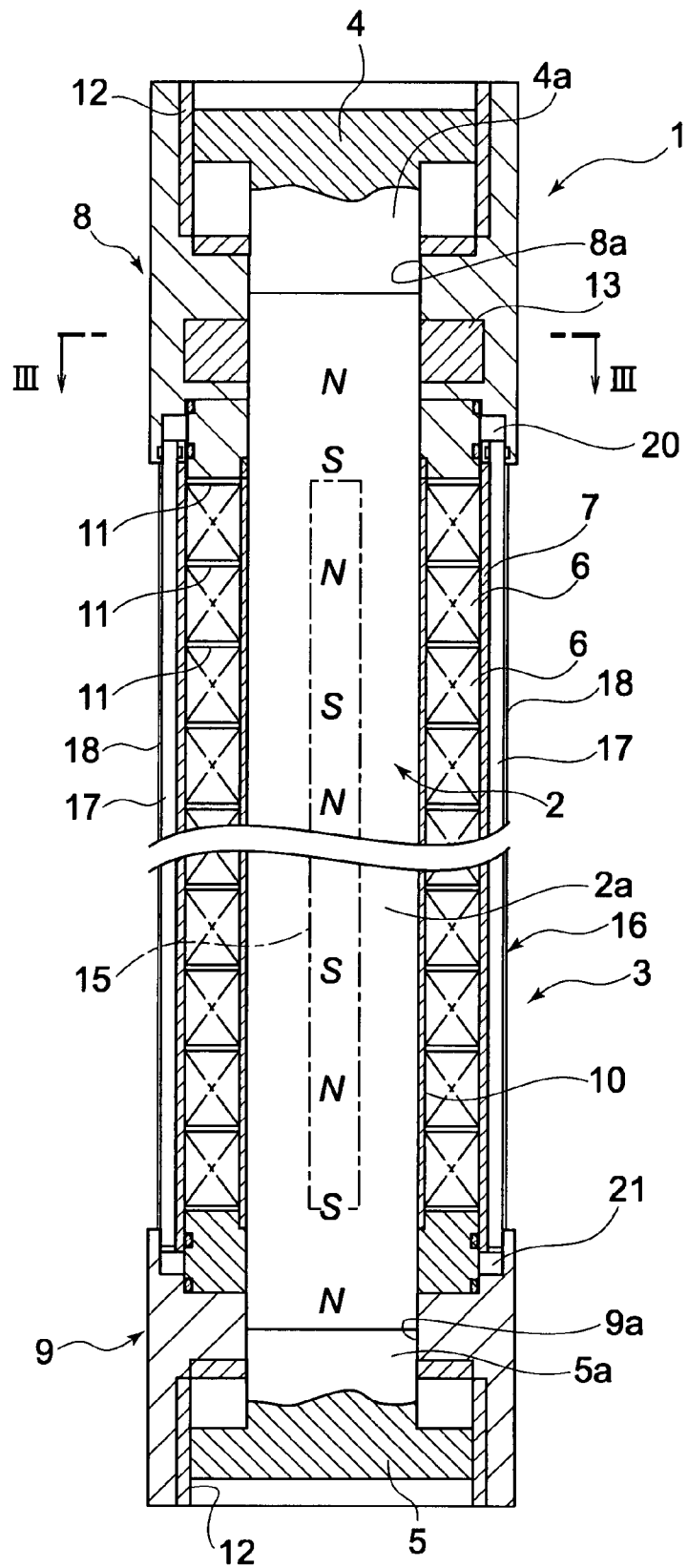
FIG. 1 is a vertical sectional view of a linear motor in accordance with a first embodiment of the present invention.

A first embodiment of the present invention will be described with reference to FIG. 1 to FIG. 3.

A linear motor 1 comprises a magnet member 2 composed of permanent magnets having N poles and S poles alternately arranged in a predetermined axial direction, and a coil member 3 that surrounds the periphery of the magnet member 2 and through which the magnet member 2 is movable in the axial direction relative to the coil member 3. The coil member 3 serves as a stator, and the magnet member 2 serves as a moving member.

The magnet member 2 has a magnet member main body 2a composed of a permanent magnet 2a and sliders 4, 5 attached to the opposite ends of the magnet member main body 2a.

The coil member 3 is configured as a coil unit having a plurality of cylindrical coils 6 arranged in the axial direction so as to surround the periphery of the magnet member 2. The plurality of coils 6 are accommodated in a common cylindrical coil case 7, and caps 8, 9 are attached to the respective ends of the coil case 7 to constitute the coil member 3.

Ring-like radiator plates 11 are each interposed between the coils 6. The radiator plates 11 are also arranged at the opposite ends of the arrangement of the coils 6. The radiator plates 11 are in contact with an inner peripheral surface of the coil case 7. Each of coils 6 is located around the outer periphery of a common cylindrical coil bobbin 10. The coils 6 are axially inserted into the coil case 7 with the coil bobbin 10 already inserted therein. The plurality of coils 6 are molded inside the coil case 7 together with the radiator plates 11 for integration. Wires 14 (see FIG. 2) connecting the plurality of coils 6 together are taken out through a connecting opening 15 formed in the coil case 7. The connecting opening 15 is formed like a slot extending in the axial direction across a plurality of the coils 6.

As shown in FIG. 1, a cylindrical bush 12 is provided inside the inner periphery of each of the caps 8, 9 attached to the respective ends of the coil case 7; the cylindrical bushes 12 serve as sliding bearings that are slidably fitted around respective sliders 4, 5 attached to the corresponding ends of the magnet member 2. The caps 8, 9 are shaped like cylinders each having a stepped inner peripheral surface, and the sliders 4, 5 are shaped like shafts each having a stepped outer peripheral surface. The bush 12 is provided inside a larger-diameter-side inner peripheral surface of each of the caps 8, 9. The bush 12 holds a very small gap that allows the magnet member 2 and the coil member 3 to move relative to each other. That is, the very small gap for axial movement is held between the an inner peripheral surface of the coil bobbin 10 for the coils 6 and an outer peripheral surface of the magnet member 2, and between each of the outer peripheral surfaces of smaller diameter portions 4a, 5a of the sliders 4, 5 attached to the opposite ends of the magnet member 2 and the smaller-diameter-side inner peripheral surfaces 8a, 9a of the caps 8, 9. The means for holding the gap between the magnet member 2 and the coil member 3 need not necessarily comprise any linear motor. Equipment utilizing the linear motor may have the gap holding means.

The coil member 3 has a magnetic substance 13 located at an end of the arrangement of the coils 6 to allow the magnet member 2 to exert a magnetic attractive force. The magnetic substance 13 is shaped like a ring having an inner diameter allowing the magnetic substance 13 to be loosely fitted around the outer periphery of the magnet member 2. The magnetic substance 13 is composed of iron or another ferromagnetic substance. In the present embodiment, the magnetic substance 13 is embedded around the inner peripheral surface of the cap 8. The axial position of the magnetic substance 13 is such that even though, for example, the magnet member 2 moves relative to the coil member 3, the magnetic substance 13 is always located around the periphery of the magnet member 2.

A forcible cooling section 16 is provided around the outer periphery of the coil case 7. The forcible cooling section 16 is composed of a plurality of cooling pipes 17 arranged at equal intervals in a circumferential direction and each extending in the axial direction. The opposite ends of each cooling pipe 17 are in communication with annular aggregate paths 20, 21 provided in the respective caps 8, 9 at the opposite ends of the coil case 7. The aggregate paths 20, 21 are connected to circulation devices (not shown in the drawings) for a cooling liquid.

In the linear motor 1 configured as described above, the coil member 3 has the magnetic substance 13, which is located opposite the magnet member 2. Thus, even if an excitation current for the coils 6 in the coil member 3 is interrupted, a magnetic attractive force is generated between the magnet member 2, composed of the permanent magnets, and the magnetic substance 13 to prevent the magnet member 2 from falling down. At this time, the magnet member 2 holds the current position or moves to and remains at a position where the magnetic attractive force acting between the magnet member 2 and the magnetic substance 13 is balanced with an external force such as gravity which acts on the magnet member 2. In this case, the only requirement is the provision of the magnetic substance 13. The linear motor 1 thus has a simpler configuration than a linear motor having means for holding the current position such as a spring or a cylinder device. Thus, the simple configuration can be used to prevent the magnet member from moving inadvertently when the power supply is turned off.

Figure 3:
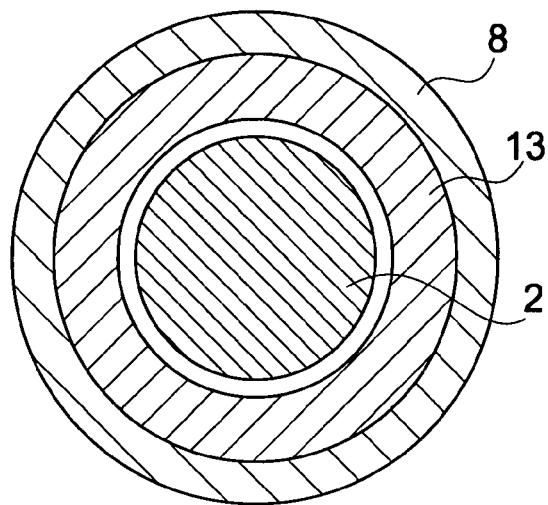
FIG. 3 is a sectional view of the linear motor taken along line III-III in FIG. 1.
Figure 4:
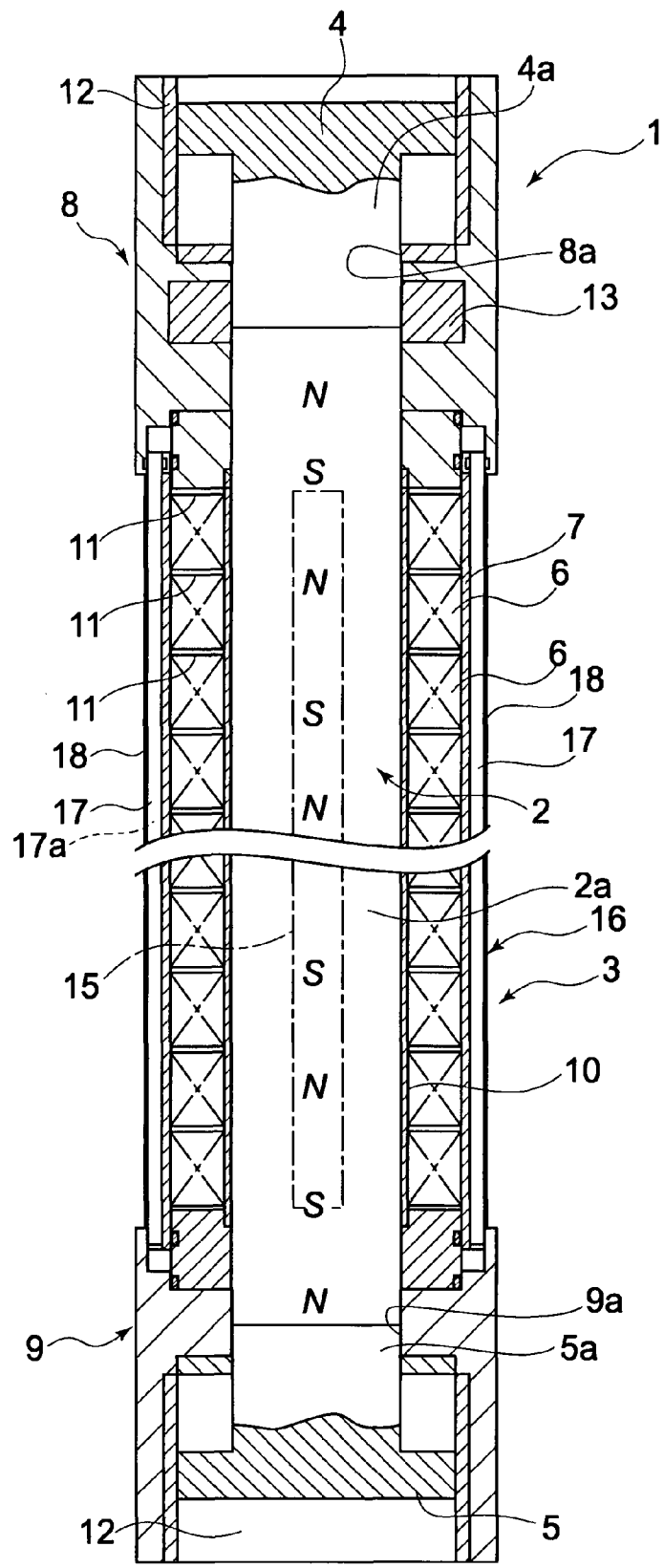
FIG. 4 is a vertical sectional view of a linear motor in accordance with another embodiment of the present invention.

FIG. 4 shows another embodiment of the present invention. In the present embodiment, the axial position of the magnetic substance 13 is such that when the magnet member 2 moves downward relative to the coil member 3, the magnetic substance 13 falls outside the range of the magnets of the magnet member 2. The other arrangements of the present invention are similar to those of the first embodiment, shown in FIG. 1 to FIG. 3.

In the present embodiment, when the magnet member 2 is stopped, the magnetic substance 13 is located around the outer periphery of the magnet member 2. When the magnetic substance 2 is driven forward or backward for processing, the magnet member 2 is moved forward or backward below and away from the magnetic substance 13. This allows the magnetic substance 13 to prevent the magnet member 2 from falling down when the power supply is turned off. Further, while the magnet member 2 is being driven forward or backward, the magnetic attractive force acting on the magnetic substance 13 can be prevented from resisting the forward or backward driving.

FIG. 5 shows a linear motor control device 30 controlling the linear motor 1 in accordance with the embodiment shown in FIG. 4 as well as an example of a control operation. The linear motor control device 30 may be composed of an electronic circuit or composed of a computer. The linear motor control device 30 controls an excitation current for the coils 6 in the coil member 2 of the linear motor 1 to control the operation of the magnet member 2.

The linear motor control device 30 has a steady-state operation area moving-forward and -backward control means 31, and an operation start and stop control means 32.

The steady-state operation area moving-forward and -backward control means 31 performs control such that the magnet member 2 moves forward and backward in a steady-state operation area R2 positioned below a fall-down inhibition enabled area R1 that is a height area in which the magnetic substance 13 prevents the magnet member 2 from falling down. The operation start and stop control means 32 performs control such that the magnet member 2 operates over the steady-state operation area R2, and the fall-down inhibition enabled area R1 and stops in the fall-down inhibition enabled area R1.

Where, for example, an instruction to move the magnet member 2 forward or backward a number of times is externally input to the linear motor control device 30, the linear motor control device 30 allows the operation start and stop control means 32 to provide the coil member 3 with an excitation current required to lower the magnet member 2 from a predetermined elevation standby position (for example, a position shown in FIG. 5A in the fall-down inhibition enabled area R1 to the steady-state operation area R2. The linear motor control device 30 subsequently allows the operation start and stop control means 32 to output an excitation current for lowering or elevation so as to elevate or lower the magnet member 2 by an instructed number of times within the steady-state operation area R2. FIG. 5B shows that the magnet member 2 is located at an upper end of the steady-state operation area R2. FIG. 5C shows that the magnet member 2 is located at a lower end of the steady-state operation area R2. After the instructed number of lowering or elevating operations, the linear motor control device 30 again allows the operation start and stop control means 32 to elevate and return the magnet member 2 to the predetermined elevation standby position in the fall-down inhibition enabled area R1.

With this control, even if the power supply for the coil member 3 is turned off during a stopped state or the power supply is inadvertently interrupted during the stopped state with the power supply kept on, the magnetic attractive force of the magnet member 2 acting on the magnetic substance 13 prevents the magnet member 2 from falling down. When the magnet member 2 performs a moving-forward or -backward operation, the magnet member 2 performs the operation in the steady-state operation area R2, located below the fall-down inhibition enabled area R1. This prevents the magnetic substance 13 from resisting the operation or reduces the degree to which the magnetic substance 13 resists the operation. The linear motor control device can thus prevent the magnet member 2 from falling down when the power supply is turned off. Further, during operation, the linear motor control device can prevent the fall-down preventing means from imposing excess loads.

Figure 6:
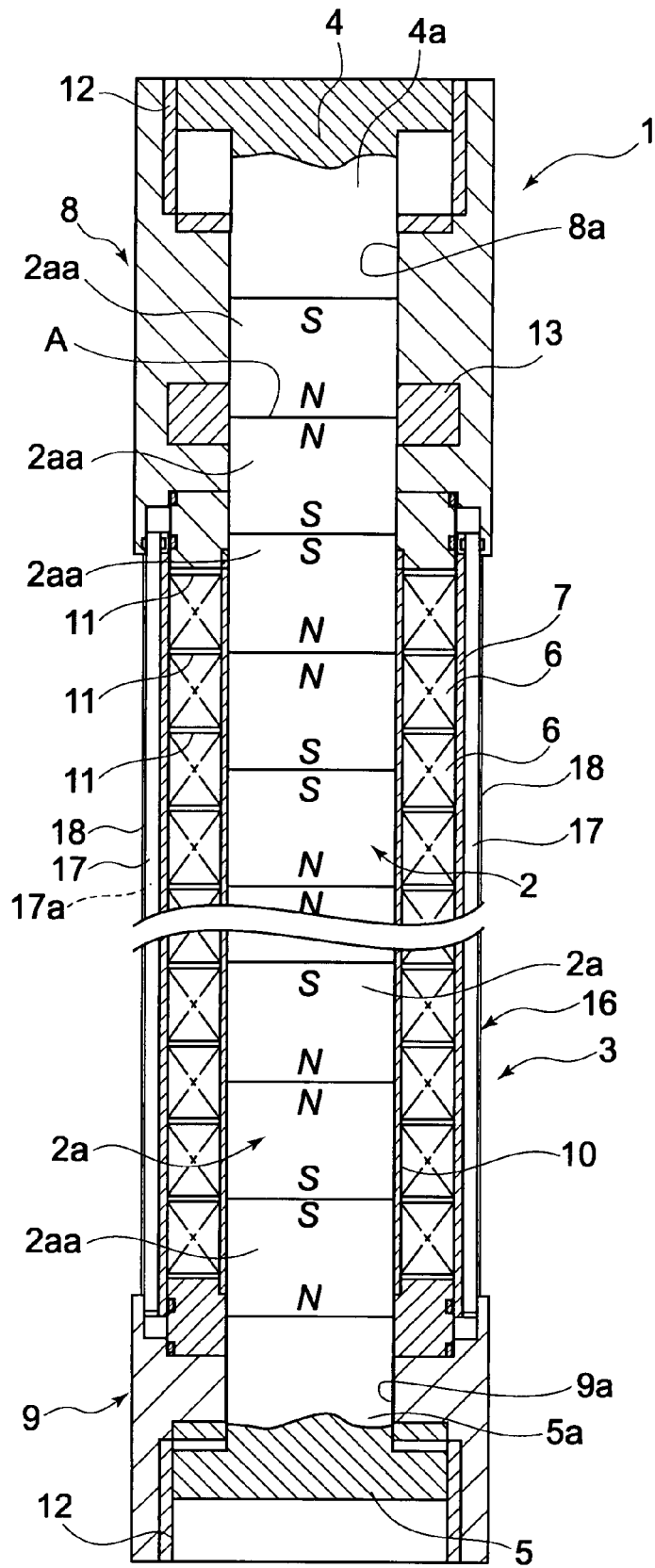
FIG. 6 is a vertical sectional view showing that a linear motor in accordance with yet another embodiment of the present invention has elevated to a top dead center.
Figure 7:
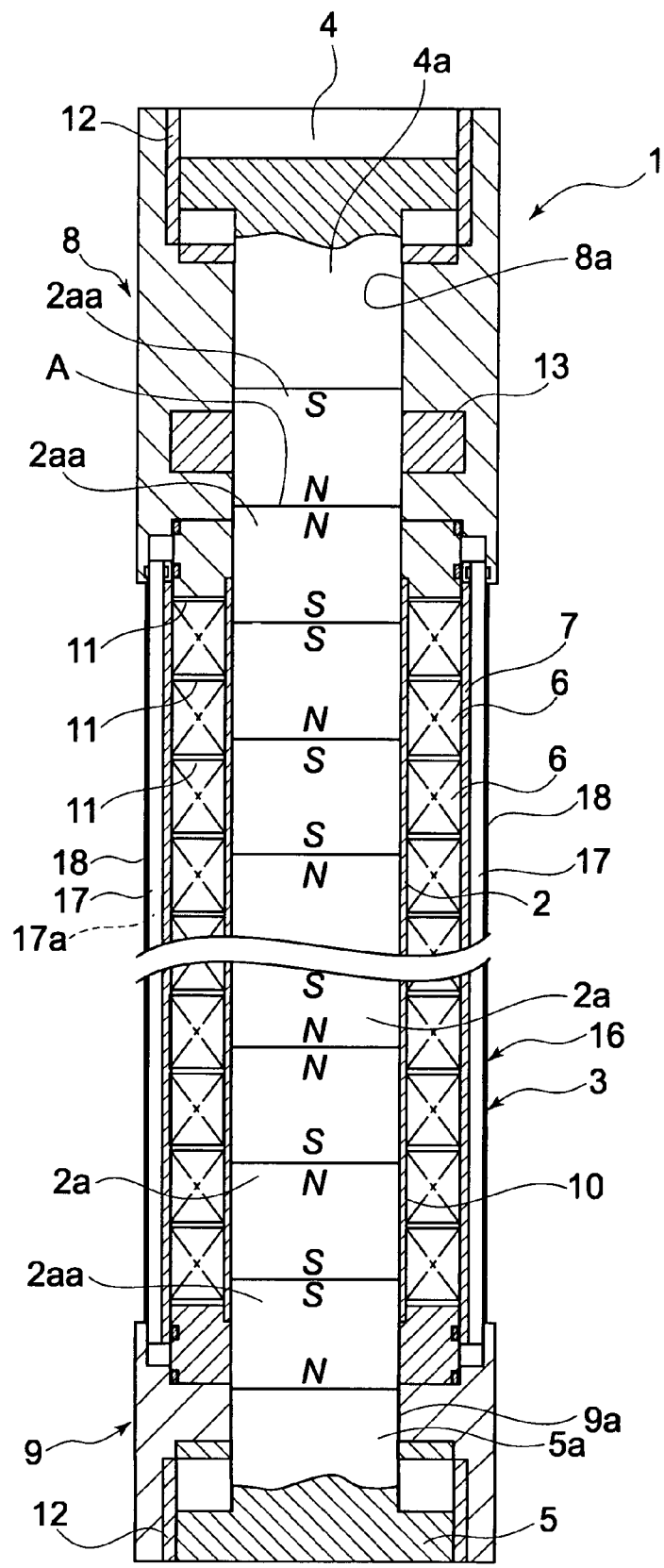
FIG. 7 is a vertical sectional view showing that the linear motor in accordance with the embodiment shown in FIG. 6 has lowered to a bottom dead center.

FIG. 6 and FIG. 7 show yet another embodiment of the present invention.

Figure 2:
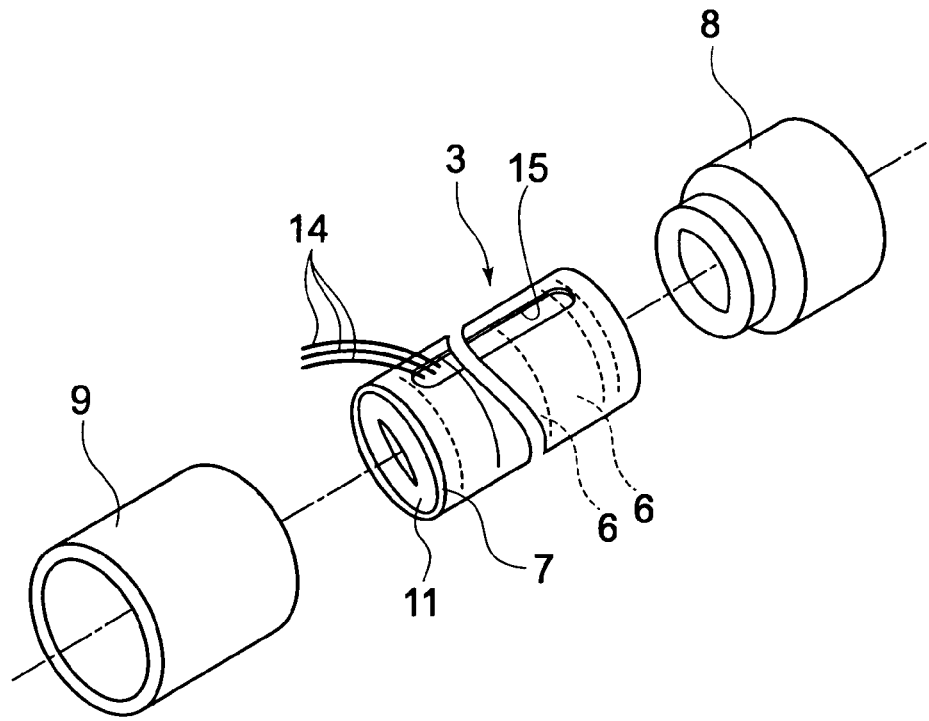
FIG. 2 is an exploded perspective view of a coil member in the linear motor.

The present embodiment corresponds to the first embodiment, shown in FIG. 1 to FIG. 3, in which a magnet member main body 2a of the magnet member 2 is composed of a plurality of unit magnets 2aa having respective N poles and S poles, and stacked so that the magnetic poles of the same polarity lie opposite each other. Since an overlapping surface at which the magnetic poles of the same polarity overlap constitutes a repulsion surface, the plurality of unit magnets 2aa are coupled together against the magnetic repulsion Forces of the repulsion surfaces. The coupling is achieved by, for example, a bolt (not shown in the drawings) inserted through the unit magnets.

Further, in the present embodiment, the magnetic substance 13 is installed in the vicinity of the upper end of the coil member 3. However, the magnet member 2 and the magnetic substance 13 are arranged at respective height positions that are in a relationship described below. That is, as shown in FIG. 6, with the magnet member 2 moved to a top dead center with respect to the coil member 3, the magnetic substance 13 is installed at a height such that the center of the vertical width of the magnetic substance 13 is positioned at the height position of a repulsion surface A that is an overlapping surface between the highest unit magnet 2aa and the second highest unit magnet 2aa of the magnet member 2 or at a height position in the vicinity of the repulsion surface A.

FIG. 7 shows that the magnet member 2 has lowered to a bottom dead center. The center of the vertical width of the magnetic substance 13 is positioned substantially midway between the S pole and the N pole of the unit magnet 2aa.

Thus, in the present embodiment, the coil member 3 is driven by the excitation current so as to elevate and lower the magnet member 2 at a stroke substantially half the vertical thickness of the single unit magnet 2aa. Further, the magnet member 2 has such a magnetic intensity as described below. Where the magnetic substance 13 corresponds to the position between the S pole and the N pole as shown in FIG. 7, the weight of the magnet member 2 cannot be held by the magnetic attractive force. However, where the magnetic substance 13 corresponds to the height position of the repulsion surface A as shown in FIG. 6, the weight of the magnet member 2 can be held. The other arrangements of the present embodiment are similar to those of the first embodiment, shown in FIG. 1 to FIG. 3.

The function of the present embodiment will be described. A magnetic field generated by the magnet member 2 has the highest magnetic flux density at the repulsion surface A, the overlapping surface between the unit magnets 2aa, and the lowest magnetic flux density at the position midway between the N pole and the P pole, corresponding to the center of the thickness of the unit magnet 2aa. The magnetic attractive force exerted on the magnetic substance 3 by the magnet member 2 where the repulsion surface A between the unit magnets 2aa is positioned with respect to the center of the vertical thickness of the magnetic substance 13 as shown in FIG. 6 is, for example, about several times as great as that exerted on the magnetic substance 3 by the magnet member 2 where the center of the thickness of the unit magnet 2aa is located as shown in FIG. 7.

Thus, by placing the magnetic substance 13 at the height position corresponding to the repulsion surface A where the magnet member 2 is located at the top dead center, it is possible to exert the greatest magnetic attractive force between the magnetic substance 13 and the magnet member 2. This allows the magnetic substance 13 to reliably prevent the magnet member 2 from falling down. The magnet member 2 is held at the top dead center.

Where the magnetic substance 13 is provided to prevent the magnet member 2 from falling down as described above, the location of the magnetic substance 13 and the stroke range of the magnet member 2 are preferably set so as to prevent cogging during the steady-state operation of the linear motor 1. This may be achieved by setting the steady-state operation area R2 of the magnet member 2 within a range equal to or shorter than a cogging occurrence period. The present embodiment drives the coil member 3 by the excitation current so as to elevate and lower the magnet member 2 at a stroke substantially half the vertical thickness of the single unit magnet 2aa. This makes it possible to prevent possible cogging.

Even with the positional relationship between the magnet member 2 and the magnetic substance 13 in accordance with the present embodiment, it is possible to use the control performed by the linear motor control device 30, having the steady-state operation area moving-forward and -backward control means 31 and the operation start and stop control means 32, described above with reference to FIG. 5. In this case, for example, where the range within which the repulsion surface A between the highest magnet member 2aa and the second highest magnet member 2aa is within the vertical width of the magnet member 13 corresponds to the fall-down inhibition enabled area R1, in which the magnetic substance 13 inhibits the magnet member 2 from falling down, the steady-state operation area R2 corresponds to the range from a position where the repulsion surface A is located below and away from a bottom surface of the magnetic substance 13 to the bottom dead center in FIG. 7.

In the embodiment shown in FIG. 6 and FIG. 7, the magnetic substance 13 is located at the position corresponding to the repulsion surface A between the highest unit magnet 2aa and the second highest unit magnet 2aa of the magnet member 2. However, the magnetic substance 13 may be located at a position corresponding to the repulsion surface A between other unit magnets 2aa. Further, to increase the attractive force, a plurality of magnetic substances 13 may be provided in association with a plurality of different repulsion surfaces A.

Furthermore, the magnet member 2 is not limited to the plurality of stacked unit magnets 2aa but may be a single integral bar-like permanent magnet having a plurality of N poles and S poles alternately provided along a longitudinal direction. In this case, with the magnet member 2 moved to the top dead center, the magnetic substance 13 is installed at a height such that the center of the vertical width of the magnetic substance 13 coincides with the center position of the vertical width between any magnetic poles of the alternately arranged N poles and S poles or a height position in the vicinity of the center position. Where, for example, the magnet member 2 shown in FIG. 6 is considered to be an integral magnet, the center of the vertical width between the magnetic poles corresponds to the position of each repulsion surface A.

Figure 8:
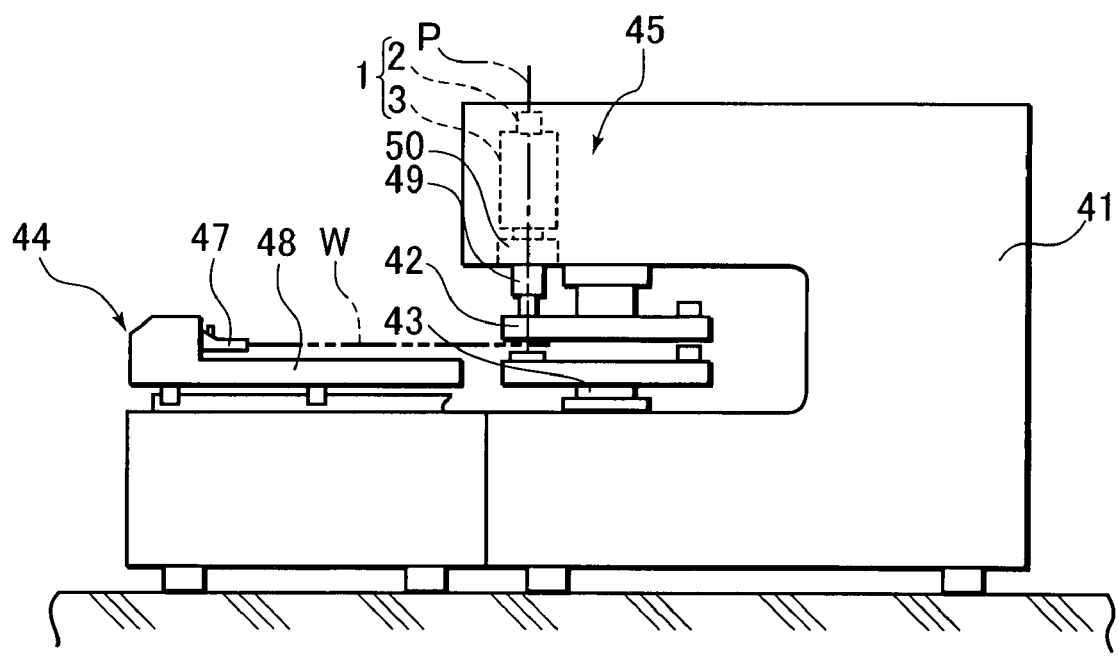
FIG. 8 is a side view of a press machine that is a machine tool using the linear motor in accordance with an embodiment of the present invention.

FIG. 8 shows a press machine that is an example of a machine tool using the linear motor as a driving source. The press machine has tool supports 42, 43 and a workpiece feeding mechanism 44 installed in a lower part of a frame 41, and a press mechanism 45 installed in an upper part of the frame 41 as a press driving source and using the linear motor 1.

The tool supports 42, 43 are composed of an upper turret and a lower turret, respectively, which are concentrically installed. Punch tools and die tools are mounted on the upper and lower tool supports 42, 43, respectively, at a plurality positions in a circumferential direction. The tool supports 42, 43 are rotated to index any of the punch tools and the die tools to a predetermined punch position P. The workpiece feeding mechanism 44 uses a work holder 47 to grip an edge of a plate-like workpiece W and moves the workpiece W forward, backward, rightward, or leftward on a table 48.

The press mechanism 45 supports a ram 49 elevating and lowering the punch tool indexed to the punch position P on the tool support 42 so that the ram 49 can be freely elevated and lowered by a ram guide 50. The press mechanism 45 thus drivingly elevates and lowers the ram 49 by means of the linear motor 1. The coil member 3 of the linear motor 1 is fixed to the frame 41. The magnet member 2 of the linear motor 1 is fixed to the ram 49, which is a movable portion. The linear motor 1 used may be, for example, the first embodiment, described above with reference to FIG. 1 to FIG. 3 or the embodiment shown in FIG. 4. Where the linear motor 1 in accordance with the embodiment shown in FIG. 4 is used, the linear motor control device 30 shown in FIG. 5 may be used.

The press machine configured as described above uses the linear motor 1 as a press driving source. Thus, the press machine eliminates the need for a mechanism converting rotation into the rectilinear motion of the ram 49 compared to a press machine using a rotary motor. The press mechanism 45 thus has a reduced number of parts and thus a simplified configuration. The present press machine also eliminates the need for a hydraulic unit compared to a press machine using a hydraulic cylinder as a press driving source. This simplifies the configuration. Furthermore, the linear motor 1 has a high positional accuracy, enabling processing with improved quality and accuracy. Additionally, the linear motor 1 used for the press machine in accordance with the present embodiment comprises the fall-down preventing function of allowing the magnetic substance 13 (FIG. 1) to prevent the magnet member 2 from falling down as described above. This also improves the safety of the press machine.

The linear motor 1 in accordance with the present invention is not limited to a ring-shaped type in which the coil member 3 surrounds the magnet member 2. In the linear motor 1, for example, the magnet member 2 may be located parallel to the coil member 3. Further, the linear motor 1 in accordance with the present invention can be used not only in the press machine but also in machine tools in general comprising a movable portion moving tools or workpieces, to drive the movable portion. Moreover, the linear motor 1 in accordance with the present invention can be used as a driving source not only for machine tools but also for various types of equipment.

While the present invention has been described with respect to preferred embodiments thereof, it will be apparent to those skilled in the art that the disclosed invention may be modified in numerous ways and may assume many embodiments other than those specifically set out and described above. Accordingly, it is intended by the appended claims to cover all modifications of the present invention that fall within the true spirit and scope of the invention.

The invention claimed is:

1. A linear motor comprising:
a magnet member composed of permanent magnets having respective N poles and S poles alternately arranged in a predetermined axial direction,
wherein said predetermined axial direction is a vertical direction,
a coil member which is located orthogonally to said axial direction with respect to the magnet member and through which said magnet member is movable in the axial direction relative to the coil member,
wherein said coil member surrounds the magnet member in a circular fashion,
a magnetic substance located in the vicinity of one end of the coil member allows the magnet member to exert a magnetic attractive force,
wherein said magnetic substance prevents the magnet member from falling down,
wherein when said coil member is energized, none of the permanent magnets in the magnetic member move completely past the magnetic substance,
wherein said magnet member is a movable-side member, whereas said coil member is a static-side member, said magnetic substance is located in the vicinity of an upper end of the coil member to inhibit said magnet member from falling down, and wherein said magnetic substance is installed at a height such that with the magnet member moved to a top dead center with respect to said coil member, the center of the vertical width of the magnetic substance is positioned in the vicinity of a center position of the vertical width between any magnetic poles of the N and the S poles alternately arranged in the magnet member.

2. A linear motor comprising:
a magnet member composed of permanent magnets having respective N poles and S poles alternately arranged in a predetermined axial direction,
wherein said predetermined axial direction is a vertical direction,
a coil member which is located orthogonally to said axial direction with respect to the magnet member and through which said magnet member is movable in the axial direction relative to the coil member
wherein said coil member surrounds the magnet member in a circular fashion,
a magnetic substance located in the vicinity of one end of the coil member allows the magnet member to exert a magnetic attractive force,
wherein said magnetic substance prevents the magnet member from falling down,
wherein when said coil member is energized, none of the permanent magnets in the magnetic member move completely past the magnetic substance,
wherein said magnet member is a movable-side member, whereas said coil member is a static-side member, said magnetic substance is located in the vicinity of an upper end of the coil member to inhibit said magnet member from falling down, and wherein
an excitation current for a coil member of the linear motor controls operation of the magnet member of said linear motor, the device being characterized by having a steady-state operation area moving-forward and moving-backward control means for performing control such that said magnet member performs a moving-forward and moving-backward operation within a steady state operation area positioned below a fall-down inhibition enabled area that is a height area in which said magnetic substance inhibits said magnet member from falling down, and operation start and stop control means for performing control such that said magnet member operates over said steady-state operation area and fall-down inhibition enabled area and stops in said fall-down inhibition enabled area.

* * * * *